US010650678B2

(12) United States Patent
Werner et al.

(10) Patent No.: US 10,650,678 B2
(45) Date of Patent: May 12, 2020

(54) COGNITIVE TRAFFIC LIGHT PATTERN ANALYSIS AND NOTIFICATION (71) Applicant: INTERNATIONAL BUSINESS MACHINES CORPORATION, Armonk, NY (US)

(72) Inventors: John S. Werner, Fishkill, NY (US); Kavita Sehgal, Poughkeepsie, NY (US); Sneha M. Varghese, Fishkill, NY (US); Sarah Wu, Kingston, NY (US); Diane M. Stamboni, Poughkeepsie, NY (US); Nicholas G. Danyluk, Long Island City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/106,073

(22) Filed: Aug. 21, 2018

(65) Prior Publication Data
US 2020/0066148 A1 Feb. 27, 2020

(51) Int. Cl.
H04W 4/46 (2018.01)
G08G 1/0967 (2006.01)
G06K 9/00 (2006.01)

(52) U.S. Cl.
CPC ........ G08G 1/096791 (2013.01); H04W 4/46 (2018.02); G06K 9/00825 (2013.01)

(58) Field of Classification Search
None
See application file for complete search history.

(56) References Cited

U.S. PATENT DOCUMENTS

| 4,370,718 | A | 1/1983 | Chasek |
| 8,547,250 | B1 | 10/2013 | Al-Mutawa |
| 2006/0009188 | A1* | 1/2006 | Kubota ............ G08G 1/096725 455/344 |
| 2011/0095906 | A1* | 4/2011 | Stahlin .................. G08G 1/095 340/905 |
| 2012/0143395 | A1* | 6/2012 | Yamada ................ B60W 40/08 701/1 |
| 2015/0105989 | A1 | 4/2015 | Lueke et al. |
| 2017/0316273 | A1 | 11/2017 | Ferguson et al. |
| 2018/0032076 | A1 | 2/2018 | Lombrozo et al. |
| 2018/0096597 | A1* | 4/2018 | Mortazavi ........ G08G 1/096725 |

OTHER PUBLICATIONS

Mell, Peter et al. "The NIST Definition of Cloud Computing" National Institute of Standards of Technology, Special Publication 800-145; Sep. 2011; 7 pgs.

* cited by examiner

Primary Examiner — John F Mortell
(74) Attorney, Agent, or Firm — Cantor Colburn LLP; Teddi Maranzano (57) ABSTRACT Methods, systems and computer program products providing traffic light status notifications to drivers are provided. Aspects include determining that a first vehicle, operated by the driver, is approaching a traffic light and receiving, by the first vehicle, traffic light status data from one or more second vehicles in a vicinity of the traffic light via vehicle-to-vehicle communication. Aspects also include obtaining a traffic light pattern for the traffic light from a traffic light pattern database and determining a predicted status of the traffic light at a time when the first vehicle will reach the traffic light based on a speed of the first vehicle, the traffic light status data, and the traffic light pattern. Aspects further include notifying the driver of the predicted status of the traffic light.

20 Claims, 8 Drawing Sheets

COGNITIVE TRAFFIC LIGHT PATTERN ANALYSIS AND NOTIFICATION

BACKGROUND

The invention relates generally to motor vehicle operation and, more specifically, to analyzing traffic light patterns and providing traffic light status notifications to drivers.

A large number of accidents happen at traffic light intersections, where vehicles approaching have no information about the current state of the light, other than what the driver is able to observe. In many cases, drivers approaching intersection may increase their speed to make it through the light rather than using precaution to avoid potentially hitting upcoming traffic from other directions.

Currently, vehicle-to-vehicle (V2V) communication is being developed that will allow vehicles to communicate with each other as well as other devices such as traffic lights. However, implementing this communication protocol such that the existing traffic lights can provide light status information directly to approaching vehicles will require a large cost burden and take a significant amount of work to retrofit or replace existing traffic lights.

SUMMARY

According to an embodiment, a system for providing traffic light status notifications to drivers is provided. The system includes a memory having computer readable computer instructions, and a processor for executing the computer readable instructions. The computer readable instructions include instructions for determining that a first vehicle, operated by the driver, is approaching a traffic light and receiving, by the first vehicle, traffic light status data from one or more second vehicles in a vicinity of the traffic light via vehicle-to-vehicle communication. The computer readable instructions also include instructions for obtaining a traffic light pattern for the traffic light from a traffic light pattern database and determining a predicted status of the traffic light at a time when the first vehicle will reach the traffic light based on a speed of the first vehicle, the traffic light status data, and the traffic light pattern. The computer readable instructions further include instructions for notifying the driver of the predicted status of the traffic light.

According to another embodiment, a method for providing traffic light status notifications to drivers is provided. The method includes determining that a first vehicle, operated by the driver, is approaching a traffic light and receiving, by the first vehicle, traffic light status data from one or more second vehicles in a vicinity of the traffic light via vehicle-to-vehicle communication. The method also includes obtaining a traffic light pattern for the traffic light from a traffic light pattern database and determining a predicted status of the traffic light at a time when the first vehicle will reach the traffic light based on a speed of the first vehicle, the traffic light status data, and the traffic light pattern. The method further includes notifying the driver of the predicted status of the traffic light.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes determining that a first vehicle, operated by the driver, is approaching a traffic light and receiving, by the first vehicle, traffic light status data from one or more second vehicles in a vicinity of the traffic light via vehicle-to-vehicle communication. The method also includes obtaining a traffic light pattern for the traffic light from a traffic light pattern database and determining a predicted status of the traffic light at a time when the first vehicle will reach the traffic light based on a speed of the first vehicle, the traffic light status data, and the traffic light pattern. The method further includes notifying the driver of the predicted status of the traffic light.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
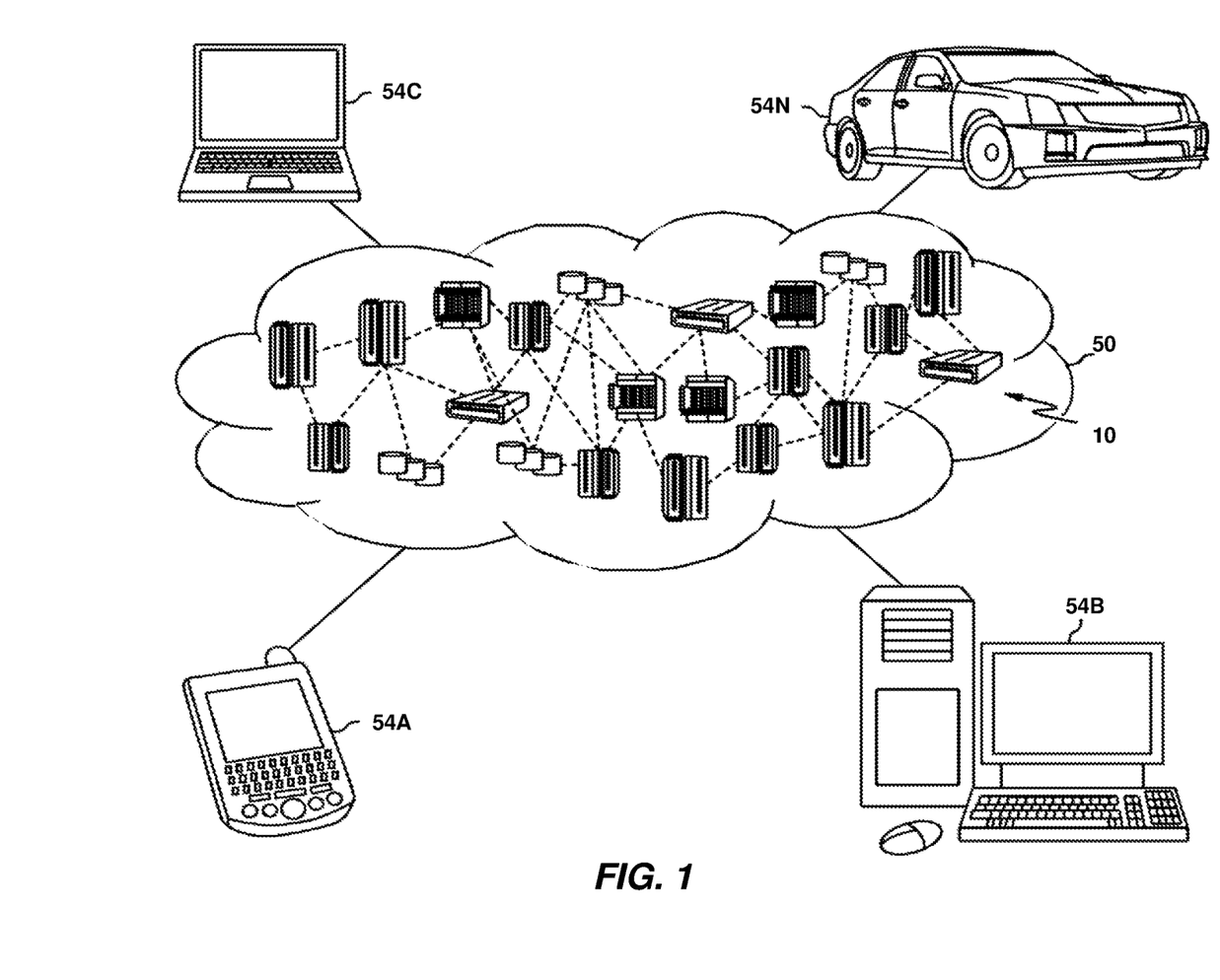
FIG. 1 depicts a cloud computing environment according to one or more embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
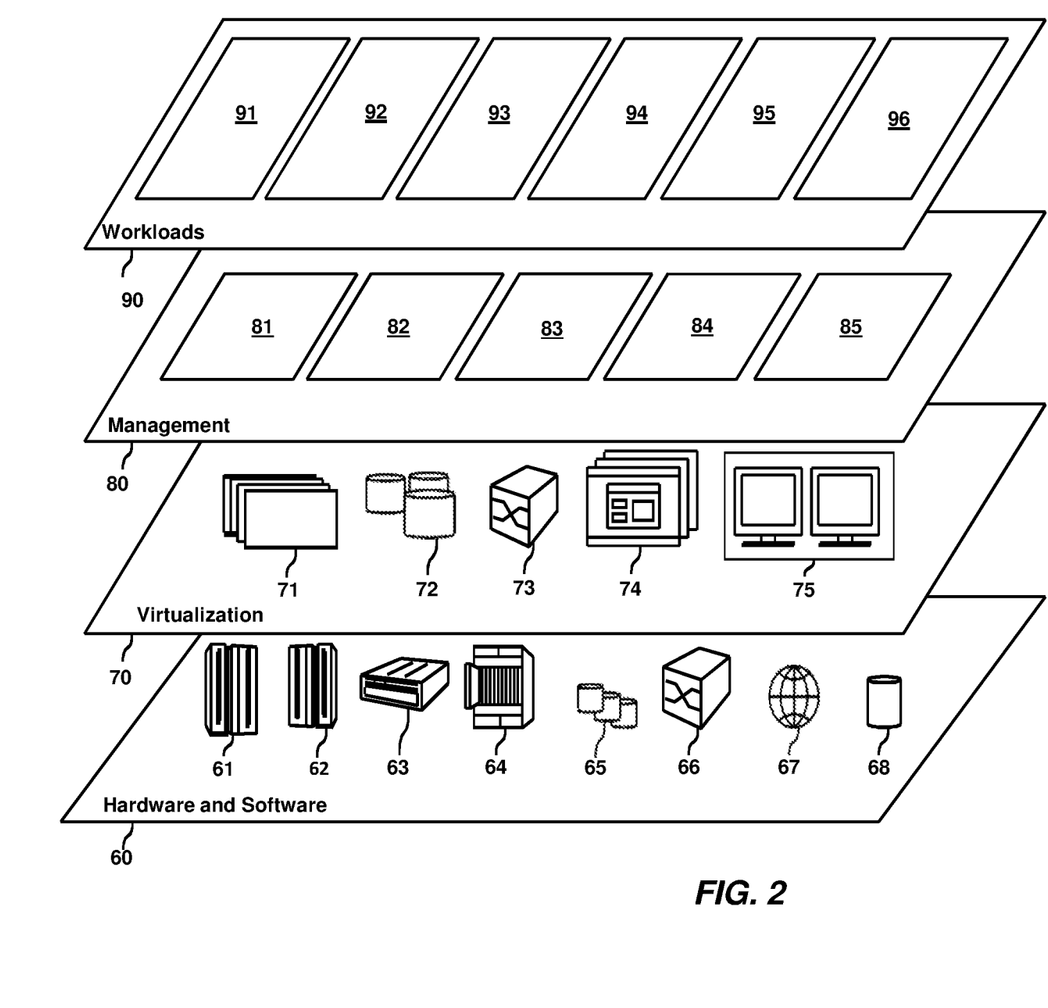
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and traffic light pattern analysis and notifications 96.

Figure 3:
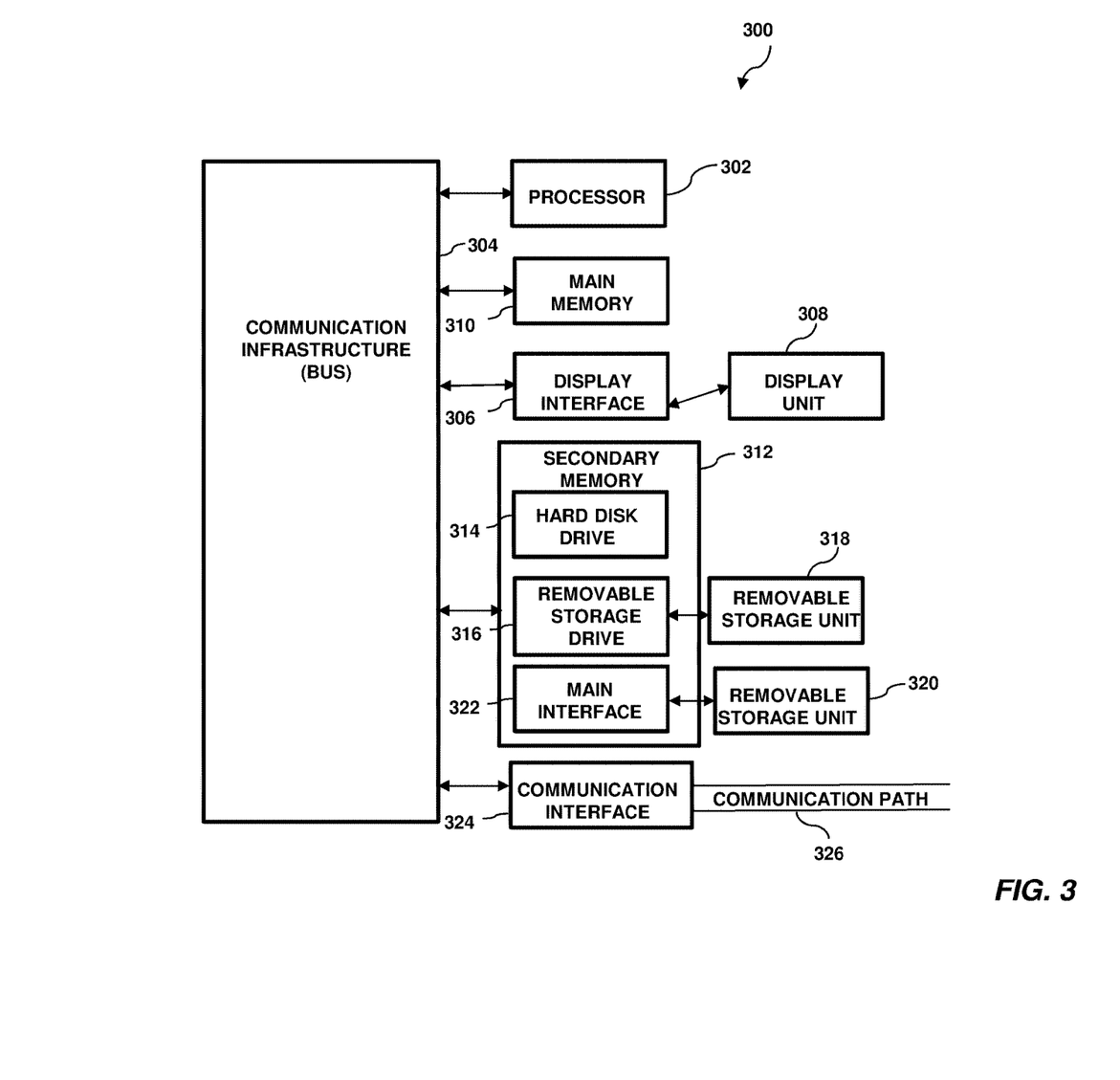
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In accordance with exemplary embodiments, systems, methods and computer program products for traffic light pattern analysis and notification are provided. In one embodiment, traffic light status data, i.e., what state the traffic light is in for a given direction of travel, is continuously received from vehicles in the vicinity of the traffic light. The traffic light status data is analyzed and a traffic light pattern for the traffic light is determined and stored in a traffic light pattern database. Vehicles in the vicinity of a traffic light can access the traffic light pattern from the traffic light pattern database and can receive information from nearby vehicles about the future status of the traffic light at the estimated time that they will reach the traffic light based on where in the learned pattern the light was when nearby vehicles passed by the traffic light. In exemplary embodiments, a traffic light status notification (e.g., via GPS navigation system, via speakers in the vehicle, via a symbol on a heads up display, etc.) can be provided to a vehicle approaching a traffic light based on traffic light status data received from other vehicles and on a traffic light pattern. The traffic light status notification will indicate an expected state of the traffic light when the vehicle reaches the traffic light based on a current speed of the vehicle and distance from the traffic light. In exemplary embodiments, the traffic lights can be traffic lights that are controlled based on timers as well as traffic lights that are controlled by one or more sensors.

A traffic light can be configured to utilize various different traffic light patterns at different points in time. For example, a traffic light can execute different traffic light patterns during different times of the day, such as morning commute, evening commute, or other times. Likewise, a traffic light can execute different traffic light patterns on different days (weekdays verses weekends) or during different times of the year (when school is in session versus summer). Accordingly, the traffic light pattern database can be configured to store multiple traffic light patterns for each traffic light and can provide the appropriate traffic light pattern to a vehicle when requested, based on the date and time that the request was received.

Figure 4:
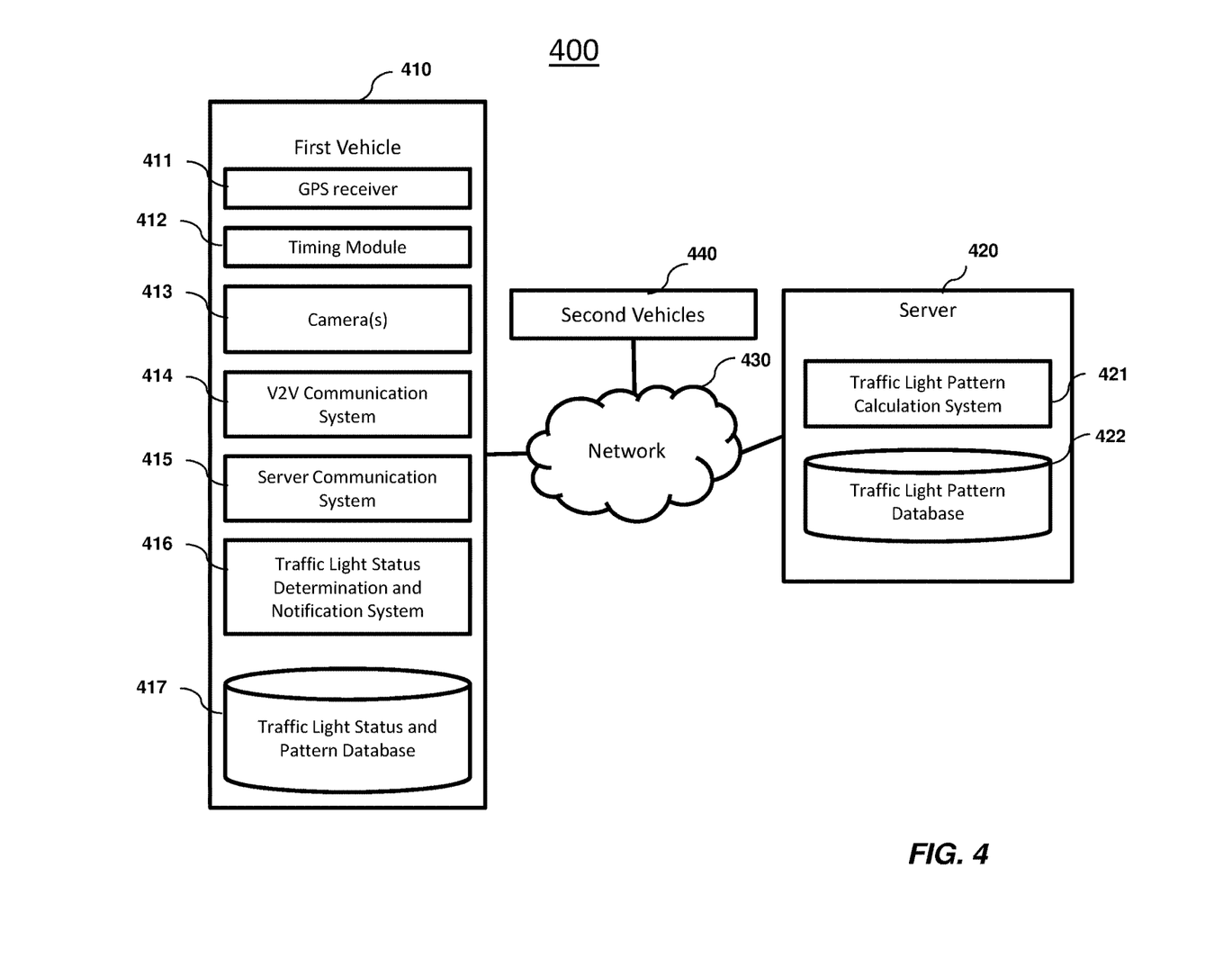
FIG. 4 depicts a system upon which traffic light pattern analysis and notification processes may be implemented according to one or more embodiments of the present invention.

Turning now to FIG. 4, a system 400 upon which the traffic light pattern analysis and notification processes may be implemented will now be described in accordance with an embodiment. The system 400 shown in FIG. 4 includes a first vehicle 410, a server 420, a communication network 430 and one or more second vehicles 440. The first vehicle 410 and the second vehicles 440 are configured to communicated with each other directly via network 430 (e.g., using vehicle-to-vehicle (V2V) communication) when the vehicles are in the vicinity of one another. In addition, the first vehicle 410 and the second vehicles 440 are configured to communicate with the server 420 via the communications network 430. The communications network 430 may be one or more of, or a combination of, public (e.g., Internet), private (e.g., local area network, wide area network, virtual private network), and may include wireless and wireline transmission systems (e.g., satellite, cellular network, terrestrial networks, etc.).

In exemplary embodiments, the first vehicle 410 includes a global positioning system (GPS) receiver 411, a timing module 412, one or more cameras 413, a V2V communications system 414, a server communications system 415, a traffic light status determination and notification system 416, and a traffic light pattern and status database 417. The GPS receiver 411 is configured to determine the location of the first vehicle 410. The server 420 includes a traffic light pattern calculation system 421 and a traffic light pattern database 422. The server 420 can be implemented as a computing system, similar to the one shown in FIG. 3, or in a cloud computing system, similar to the one shown in FIGS. 1 and 2.

In one embodiment, as the first vehicle 410 determines that it is approaching a traffic light, based on the location received from the GPS receiver 411, the cameras 413 are used to capture images of the traffic light. The captured images are stamped with the GPS location and a current time that is received from the timing module 412 and are stored in the traffic light pattern and status database 417. These images are provided to the server 420, via server communications system 415, where the traffic light pattern calculation system 421 analyzes the images and creates and/or updates a traffic light pattern for the traffic light and stores it in the traffic light pattern database 422.

In exemplary embodiments, the first vehicle 410 and the second vehicles 440 are configured to communicate with each other directly via vehicle-to-vehicle (V2V) communication system 414 when the vehicles are in the vicinity of one another. The V2V communication is used to transfer data about the current state of a traffic light between vehicles, which may include the point of the traffic light within the full traffic light pattern in addition to the state of the traffic light. For example, if a second vehicle 440 recently went through a traffic light and is in communication with a first vehicle 410 that is approaching that traffic light, the second vehicle 440 will transfer data indicative of the status of the traffic light to the first vehicle 410. In one embodiment, the first vehicle 410 will receive information from a plurality of second vehicles 440 and the second vehicles 440 will also receive data about the same traffic light prior to its own approach to the traffic light.

In exemplary embodiments, the traffic light status determination and notification system 416 of the first vehicle 410 is configured to calculate an expected state of the traffic light (i.e., will the light be red, green or yellow) when first vehicle 410 will reach the traffic light based on the current speed of the first vehicle 410 and the data received from the second vehicle(s) 440. In addition, the traffic light status determination and notification system 416 will provide a notification to the driver of the first vehicle 410 that indicates the expected state of the traffic light. The notification can be provided via GPS navigation system 411, via speakers in the first vehicle 410, via a symbol on a heads up display, etc.

Figure 5:
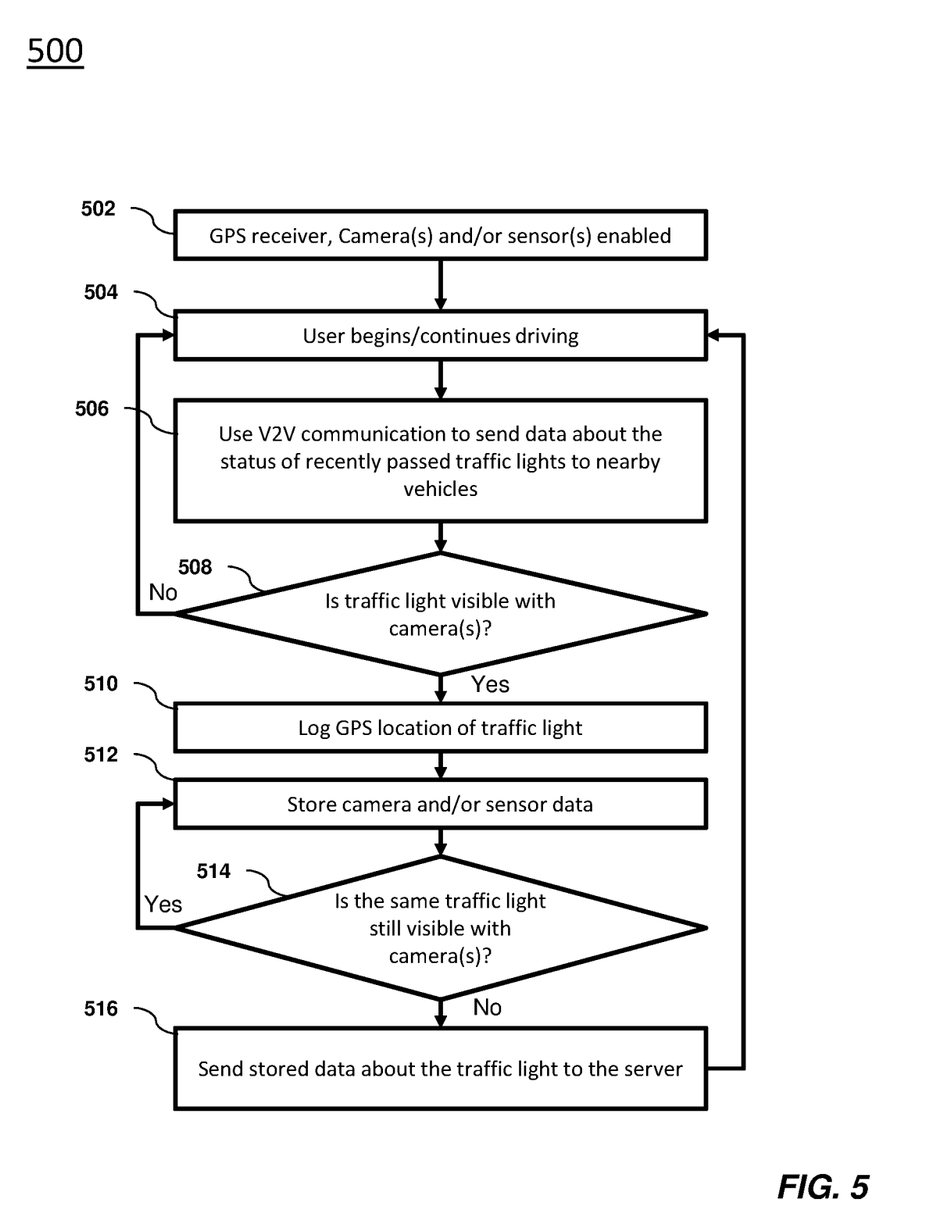
FIG. 5 depicts a flow diagram of a method for collecting traffic light data according to one or more embodiments of the present invention.

Turning now to FIG. 5, a flow diagram of a method 500 for collecting traffic light data in accordance with an embodiment is shown. The method 500 begins at block 502 and includes a user enabling a GPS receiver, cameras, or other sensors in a vehicle that may be useful in determining the pattern of a traffic light. Next, as shown at block 504, the method 500 includes the user driving the vehicle. The method 500 also includes using V2V communication to send data about the status of recently passed traffic lights to nearby vehicles, as shown at block 506. As shown at decision block 508, the method 500 includes determining if a traffic light is visible with one of the cameras on a vehicle. The cameras can include a front, rear, or side facing camera of the vehicle. If there is no traffic light visible, the method 500 returns to block 504, otherwise the method 500 proceeds to block 510. As shown at block 510, the method 500 includes logging the GPS location of the traffic light. Next, the method 500 includes storing images of the traffic light captured by the camera, as shown at block 512. The images are stored with the GPS location and a timestamp showing when and where the images were captured. Next, as shown at decision block 514 it is determined if the traffic light is still visible by the camera(s). In exemplary embodiments, the GPS location of a vehicle is logged and images and/or video from the vehicle cameras are stored for the entire time the traffic light is visible on at least one camera and may be recorded along with timestamps. This includes cameras on the rear of the vehicle (e.g., backup camera) that may be able to see the traffic light after the driver has gone through the intersection. Accordingly, if the traffic light is still viable by the camera(s), the method 500 returns to block 512. Otherwise, the method 500 proceeds to block 516 and transmits the stored data regarding the traffic light to a server for further analysis. The method then returns to block 504 to repeat during the entire duration of the trip.

Figure 6:
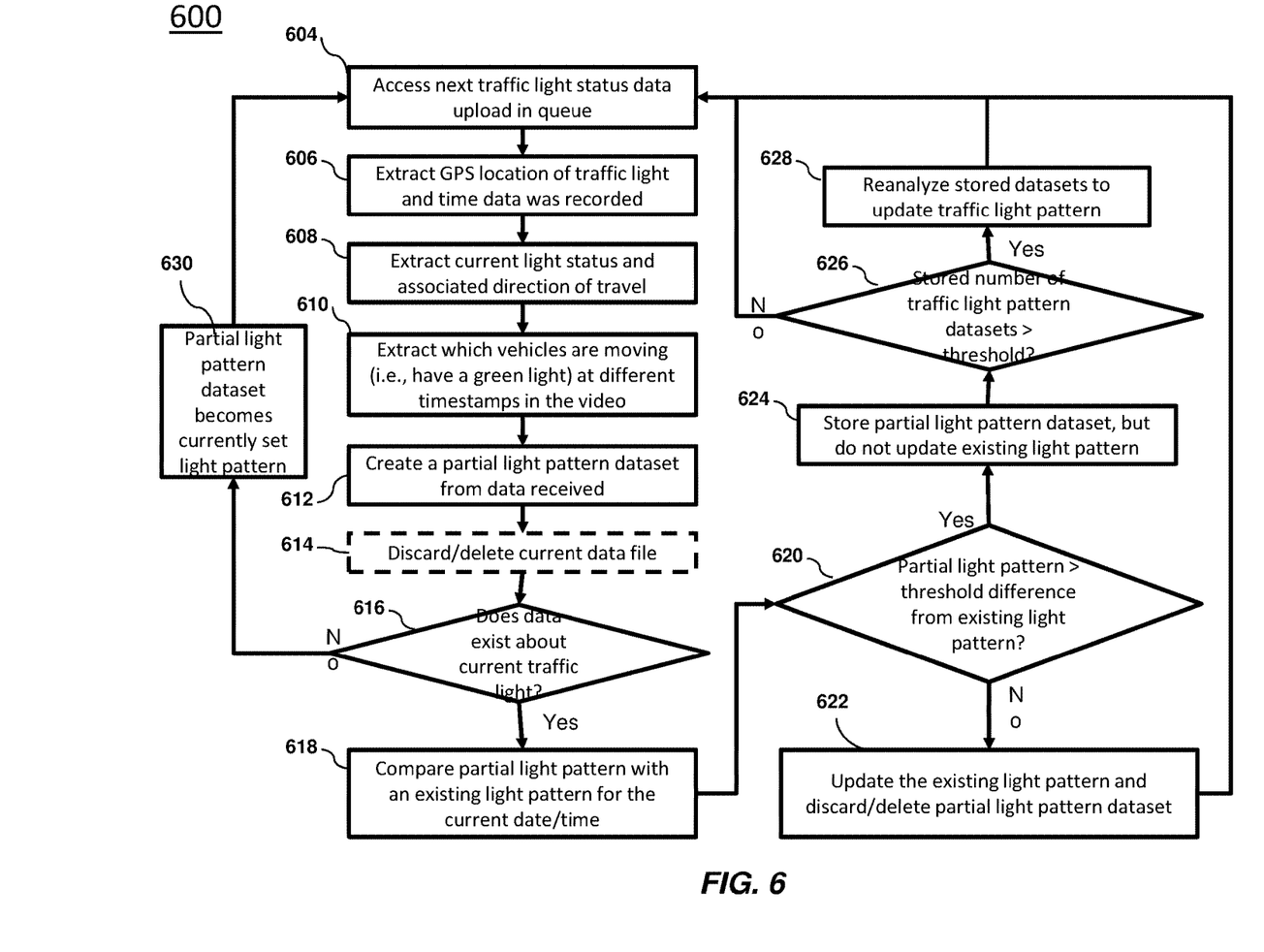
FIG. 6 depicts a flow diagram of a method for determining traffic light patterns according to one or more embodiments of the present invention.

Turning now to FIG. 6, a flow diagram of a method 600 for determining traffic light patterns by a server in accordance with an embodiment is shown. The method 600 begins at block 604 and includes accessing a next traffic light status data in a queue. In exemplary embodiments, the traffic light status data includes a date, time and location of captured images of a traffic light. The traffic light status data can also include an identification number associated with the vehicle that captured the traffic light status data. In exemplary embodiments, the GPS location not only identifies which traffic light the user is at, but may also be used to identify state and/or county laws (e.g., drivers in NY can make a right turn when the light is red, but drivers in other states may not be able to do that). Next, as shown at block 606, the method 600 includes extracting the GPS location of the traffic light and the time that the traffic light status data was recorded. As shown at block 608, the current status of the traffic light and the associated direction of travel of the vehicle through the traffic light are determined. The method 600 also includes extracting which vehicles are moving at different timestamps in the video to determine in which direction the traffic light is green (also taking state laws into consideration as mentioned earlier) or if a sensor was triggered by another vehicle that caused the light to change, as shown at block 610.

The method 600 includes creating a partial light pattern dataset from the data received and saving the partial light pattern dataset, as shown at block 612. Optionally, as shown at block 614, the method 600 includes deleting, or discarding, the received data (images and/or video) after it is used to create the partial light pattern dataset to minimize storage space on the server (e.g., server 420). Next, as shown at decision block 616, the method 600 includes determining if status data about the traffic light already exists or if the current dataset is the first upload associated with the traffic light in the current date and time range. If the status data about the traffic light does not already exist, the method 600 proceeds to block 630 and the partial light pattern dataset becomes a currently set light pattern. Otherwise, the method 600 proceeds to block 618 and the partial light pattern dataset is compared with an existing light pattern for the current date and time. Next, as shown at decision block 620 a determination is made if the partial light pattern has a difference from the existing light pattern that exceeds a threshold difference. Examples that could lead to the partial light pattern being greater than the threshold could be an emergency vehicle disrupting which vehicles travel through the light, a driver not following the law and running a red light, a school bus making a stop near a light requiring others to stop even if they have a green light, etc. In some embodiments, emergency vehicles, school buses, etc. may be detected in the visual recognition analysis and the data associated with that upload could be discarded. Another example that could lead to the partial light pattern being greater than the threshold could be that the municipality that controls the light chose to change the pattern (e.g., for better traffic flow through the intersection).

If the partial light pattern has a difference from the existing light pattern that exceeds the threshold difference, the method 600 proceeds to block 624. Otherwise, the method 600 proceeds to block 622 where the existing light pattern is updated and the partial light pattern dataset is discarded. In one embodiment, updating the existing light pattern includes making minor adjustments to the light pattern if necessary. For example, it may be determined from the partial light pattern dataset that the set red light duration in one direction was off by 0.5 seconds so the set pattern is updated.

Continuing with reference to FIG. 6, as shown at block 624, the method 600 includes storing the partial light pattern dataset but not updating the existing light pattern. Next, as shown at decision block 626, it is determined if a number of stored light pattern datasets for the traffic light exceed a threshold number. If so, the method 600 proceeds to block 628 and reanalyzes stored traffic light pattern datasets to update the traffic light pattern. Otherwise, the method 600 returns to block 604 and accesses the next traffic light status data upload in the queue. In exemplary embodiments, if the number of stored datasets is greater than a threshold number within a specified amount of time (e.g., over one week or one month), it can indicate that there was either a mistake with the set traffic light pattern or that the traffic light pattern was changed. In exemplary embodiments, a threshold number of datasets may be required prior to performing an analysis to determine the light pattern.

Figure 7:
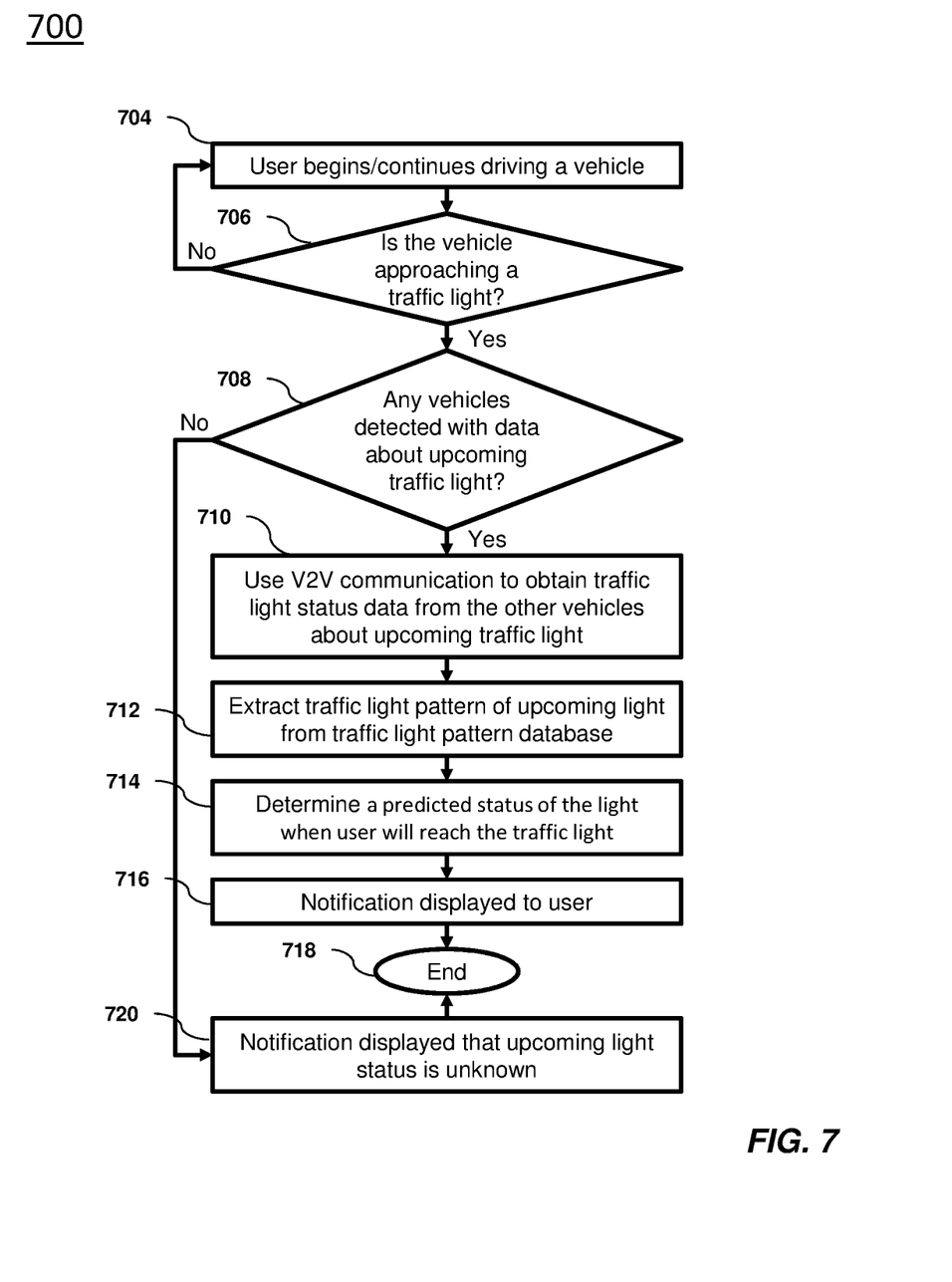
FIG. 7 depicts a flow diagram of a method for providing traffic light status notifications according to one or more embodiments of the present invention.

FIG. 7 depicts a flow diagram of a method for providing traffic light status notifications according to one or more embodiments of the present invention. As shown at block 704, the method 700 begins with a user driving a vehicle. Next, as shown at decision block 706, the method 700 includes determining if the vehicle is approaching a traffic light. In exemplary embodiments, the determination of whether the vehicle is approaching a traffic light can be based on determining that the location of the vehicle is less than a threshold distance from the light based on GPS data. This threshold distance can be based on the operating speed of the vehicle. In addition, the threshold distance is dependent upon the specific traffic light (e.g., if an area has multiple traffic lights that are not separated by a large distance, the threshold distance may be made smaller such that the user is not confused as to which traffic light they are being notified about).

If the vehicle is not approaching a traffic light, the method 700 returns to block 704. Otherwise, the method 700 proceeds to decision block 708 and determines if any vehicles are detected that have data about the upcoming traffic light. In exemplary embodiments, V2V communications are used to determine a presence of other vehicles and whether the other vehicles have data about the upcoming traffic light. If no other vehicles are detected that have data about the upcoming traffic light, the method 700 proceeds to block 720 and a notification is displayed to the driver that they are approaching a traffic light with an unknown status. If other vehicles are detected that have data about the upcoming traffic light, the method 700 proceeds to block 710 and includes using V2V communication to obtain traffic light status data from the other vehicles about the upcoming traffic light. In exemplary embodiments, the data obtained from nearby vehicles include the current state of the lights within its pattern as well as any relevant data from other vehicles recently passed by the second vehicle that may affect the predicted state of the light when the users reaches it (e.g., number of vehicles, pre-programmed destination, speed and whether the first vehicle will catch up to them before reaching the traffic light, etc.). In some embodiments, the second vehicle may have some information about the light, but may not have been able to determine the exact point in the pattern (e.g., the light was green when they approached and they went right through so they did not capture much information in passing). The first vehicle may use information from multiple second vehicles to determine the current state of the light within its pattern.

Next, as shown at block 712, the method 700 includes extracting a traffic light pattern of an upcoming light from a traffic light pattern database. The traffic light pattern database can be stored locally on a memory in the vehicle, it can be obtained via V2V from the other vehicles, or it can be obtained from a server via wireless communications. In one embodiment, if a user programs a destination into a GPS, patterns for all traffic lights along the generated route may be downloaded from the server such that they can be accessed quicker later when the driver is approaching each traffic light. The initial download may also help if there is poor connection to the server near one or more traffic lights. History data may also be accessed such that commonly passed lights (e.g., lights passed every day on the way to work, school, local grocery store, etc.) may be stored locally and periodically compared to information on the server to determine if a change in light pattern has occurred. Next, as shown at block 714, the method 700 includes determining a predicted status of the light when user will reach the traffic light. This determination is based on the light status information obtained from the other vehicles, the traffic light pattern, the current speed of the vehicle and any other vehicles that may be between the user and the traffic light (e.g., the driver may catch up to another vehicle prior to reaching the traffic light). The method 700 also includes displaying a notification to the driver of predicted status of the light when user will reach the traffic light. This notification can be provided via GPS navigation system, via speakers in the vehicle, via a symbol on a heads up display, etc. In exemplary embodiments, the notifications can include additional info such as "the light will be green, continue at current pace", "begin slowing down to save gas because the light will be red when you get there," "the light will be red at your current speed, but if you slow down by 5 mph, it will turn green and you will not have to stop," or "the light will be green, but there are 10 cars in front of you and this will likely cause it to turn red before you pass through so expect to stop." In addition to providing notifications to the driver, the vehicle can use the traffic light status and pattern data to adjust a predicted arrival time, to adjust a route to go around a predicted red light if a faster route is available, or to automatically adjust the operating speed of the vehicle, within the legal speed limits. The method 700 ends at block 718.

In one embodiment, if a first vehicle is approaching a traffic light and no other vehicles are traveling in the opposite direction, the vehicle can communicate with the server to obtain a traffic light prediction based on the most recent information available. For example, if the last vehicle to pass through the traffic light occurred ten minutes ago, the stored pattern will be used to predict the traffic light status based on what said vehicle saw 10 minutes earlier), then provide a notification to the user. In one embodiment, notifications about the status of a traffic light may not be sent to vehicles until a threshold number of datasets are analyzed such that there is a high level of confidence on the traffic light pattern and that the notification will be accurate.

Figure 8:
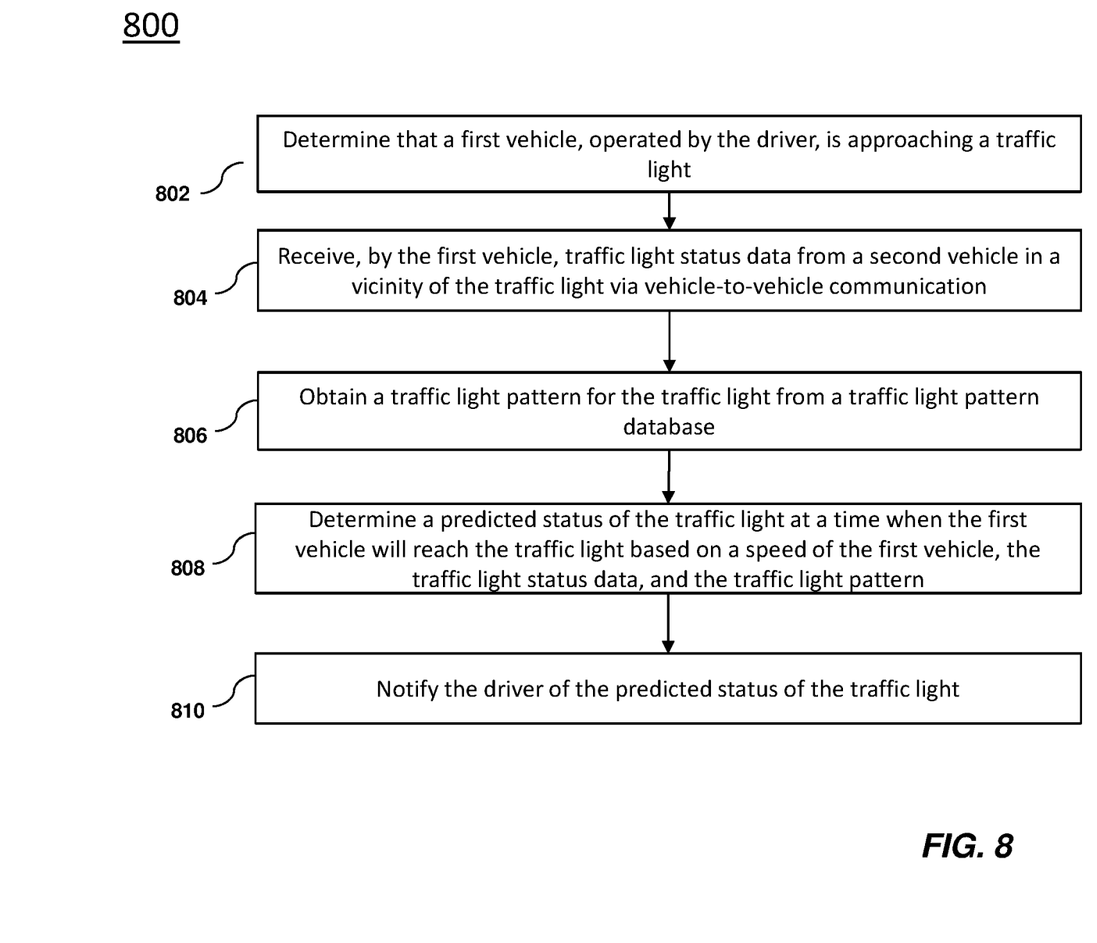
FIG. 8 depicts a flow diagram of another method for providing traffic light status notifications according to one or more embodiments of the present invention.

Turning now to FIG. 8, a flow diagram of a method 800 for providing traffic light status notifications in accordance with an embodiment is shown. As shown at block 802, the method 800 includes determining that a first vehicle, operated by the driver, is approaching a traffic light. In exemplary embodiments, this determination is made by the navigation system of the vehicle. Next, as shown at block 804, the method 800 includes receiving, by the first vehicle, traffic light status data from a second vehicle in a vicinity of the traffic light via vehicle-to-vehicle communication. The traffic light status data includes the last known color of the light and an associated timestamp as well as information the second vehicle obtained from other vehicles about said light. The method 800 also includes obtaining a traffic light pattern for the traffic light from a traffic light pattern database, as shown at block 806. The traffic light pattern database can be stored locally on the first vehicle, on the second vehicle or on a server in communication with one or both of the first and second vehicles. In exemplary embodiments, the first vehicle includes a memory that stores the traffic light pattern database for a plurality of intersections that the first vehicle regularly traverses. Next, as shown at block 808, the method 800 includes determining a predicted status of the traffic light at a time when the first vehicle will reach the traffic light based on a speed of the first vehicle, the traffic light status data, and the traffic light pattern. The method 800 also includes notifying the driver of the predicted status of the traffic light, as shown at block 810. In one embodiment, the method 800 also includes automatically adjusting the speed of the first vehicle based on the predicted status of the traffic light.

The systems and methods disclosed provide drivers with notification of the expected state of a traffic light prior to reaching an intersection without replacing the existing traffic light infrastructure. The notifications provide drivers a heads-up on the state of the traffic light in an effort to avoid potential accidents at intersections.

In one embodiment, if a first vehicle gets information from second vehicles and knows that an upcoming traffic light is going to be red when the first vehicle arrives at the traffic light, and if the first vehicle is autonomous or semi-autonomous, the first vehicle will reduce its speed by easing off the gas such that the light will be green when the first vehicle reaches the traffic light. This could allow the users brakes to last longer and save on gas and emissions into the environment. If the vehicle is not autonomous, instructions can be provided to the driver on the rate at which they should slow down the vehicle such that the same thing would happen if they follow the instructions. Also, for all notifications provided, the vehicle is configured to error on the side of caution. If the light is going to be yellow, the status provided may be that the light will be red in some embodiments to avoid the possibility that a driver will speed up above the speed limit so that they will make it through the light. In exemplary embodiments, the light status provided to the user is always one of red or green. If the light status is projected to be yellow, then a red light status will be provided to the user.

In exemplary embodiments, the methods and systems disclosed herein can also be applied to users on bicycles or to pedestrians at crosswalks using their mobile devices to communicate with each other and/or with nearby vehicles and may use a communication protocol other that V2V communication.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for providing a traffic light status notification to a driver, comprising:
    a memory having computer readable instructions; and
    a processor for executing the computer readable instructions, the computer readable instructions including instructions for:
    determining that a first vehicle, operated by the driver, is approaching a traffic light;
    receiving, by the first vehicle, traffic light status data from one or more second vehicles in a vicinity of the traffic light via vehicle-to-vehicle communication;
    obtaining a traffic light pattern for the traffic light from a traffic light pattern database, wherein the traffic light pattern is created by analyzing videos collected by a plurality of vehicles, each of the videos including a time period covering an entire time the traffic light is visible on at least one camera of the plurality of vehicles;
    determining a predicted status of the traffic light at a time when the first vehicle will reach the traffic light based on a speed of the first vehicle, the traffic light status data, and the traffic light pattern; and
    notifying the driver of the predicted status of the traffic light, wherein notifying the driver includes providing the driver with a suggested change to an operating speed of the first vehicle based on the predicted status of the traffic light.

2. The system of claim 1, wherein the computer readable instructions further include instructions for automatically adjusting the speed of the first vehicle based on the predicted status of the traffic light.

3. The system of claim 1, wherein the first vehicle includes a memory that stores the traffic light pattern database for a plurality of intersections that the first vehicle regularly traverses.

4. The system of claim 1, wherein the traffic light pattern database is stored on a server that is accessible by the first vehicle and the one or more second vehicles.

5. The system of claim 4, wherein the traffic light pattern is determined based on traffic light status data collected by a plurality of vehicles that is provided to the server.

6. The system of claim 1, wherein the traffic light status data includes a color of the traffic light and a date and time at which that color was recorded.

7. The system of claim 6, wherein the color of the traffic light is determined based on one or more images of the traffic light captured by cameras disposed on the one or more second vehicles.

8. The system of claim 1, wherein the predicted status of the traffic light provided to the driver consists of one of a red light status or a green light status.

9. A method for providing a traffic light status notification to a driver, comprising:
    determining that a first vehicle, operated by the driver, is approaching a traffic light;
    receiving, by the first vehicle, traffic light status data from one or more second vehicles in a vicinity of the traffic light via vehicle-to-vehicle communication;
    obtaining a traffic light pattern for the traffic light from a traffic light pattern database, wherein the traffic light pattern is created by analyzing videos collected by a plurality of vehicles, each of the videos including a time period covering an entire time the traffic light is visible on at least one camera of the plurality of vehicles;
    determining a predicted status of the traffic light at a time when the first vehicle will reach the traffic light based on a speed of the first vehicle, the traffic light status data, and the traffic light pattern; and
    notifying the driver of the predicted status of the traffic light, wherein notifying the driver includes providing the driver with a suggested change to an operating speed of the first vehicle based on the predicted status of the traffic light.

10. The method of claim 9, further comprising automatically adjusting the speed of the first vehicle based on the predicted status of the traffic light.

11. The method of claim 9, wherein the first vehicle includes a memory that stores the traffic light pattern database for a plurality of intersections that the first vehicle regularly traverses.

12. The method of claim 9, wherein the traffic light pattern database is stored on a server that is accessible by the first vehicle and the one or more second vehicles.

13. The method of claim 12, wherein the traffic light pattern is determined based on traffic light status data collected by a plurality of vehicle that is provided to the server.

14. The method of claim 9, wherein the traffic light status data includes a color of the traffic light and a date and time at which that color was recorded.

15. The method of claim 14, wherein the color of the traffic light is determined based on one or more images of the traffic light captured by cameras disposed on the one or more second vehicles.

16. A computer program product comprising a computer readable storage medium having program instructions embodied therewith the program instructions executable by a computer processor to cause the computer processor to perform a method, comprising:
    determining that a first vehicle, operated by a driver, is approaching a traffic light;
    receiving, by the first vehicle, traffic light status data from one or more second vehicles in a vicinity of the traffic light via vehicle-to-vehicle communication;
    obtaining a traffic light pattern for the traffic light from a traffic light pattern database, wherein the traffic light pattern is created by analyzing videos collected by a plurality of vehicles, each of the videos including a time period covering an entire time the traffic light is visible on at least one camera of the plurality of vehicles;

determining a predicted status of the traffic light at a time when the first vehicle will reach the traffic light based on a speed of the first vehicle, the traffic light status data, and the traffic light pattern; and notifying the driver of the predicted status of the traffic light, wherein notifying the driver includes providing the driver with a suggested change to an operating speed of the first vehicle based on the predicted status of the traffic light.

17. The computer program product of claim 16, wherein the method further comprises automatically adjusting the speed of the first vehicle based on the predicted status of the traffic light.

18. The computer program product of claim 16, wherein the first vehicle includes a memory that stores the traffic light pattern database for a plurality of intersections that the first vehicle regularly traverses.

19. The computer program product of claim 16, wherein the traffic light pattern database is stored on a server that is accessible by the first vehicle and the one or more second vehicles.

20. The computer program product of claim 19, wherein the traffic light pattern is determined based on traffic light status data collected by a plurality of vehicle that is provided to the server.

* * * * *